(12) United States Patent
Li et al.

(10) Patent No.: US 11,835,983 B1
(45) Date of Patent: Dec. 5, 2023

(54) TOUCH PANEL AND TOUCH DISPLAY DEVICE

(71) Applicant: HKC CORPORATION LIMITED, Shenzhen (CN)

(72) Inventors: Wang Li, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/331,497

(22) Filed: Jun. 8, 2023

(30) Foreign Application Priority Data

Sep. 30, 2022 (CN) .......................... 202211205860.X (51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC ............. G06F 3/041662; G06F 3/0446; G06F 2203/04111
See application file for complete search history.

(56) References Cited

U.S. PATENT DOCUMENTS

| | | | |
|---|---|---|---|
| 2019/0121463 A1* | 4/2019 | Park | G06F 3/0445 |
| 2019/0204952 A1* | 7/2019 | Han | G06F 3/0416 |
| 2022/0253177 A1 | 8/2022 | Fan et al. | |

FOREIGN PATENT DOCUMENTS

| | | |
|---|---|---|
| CN | 101488066 A | 7/2009 |
| CN | 103294311 A | 9/2013 |
| CN | 103699284 A | 4/2014 |
| CN | 104699314 A | 6/2015 |
| CN | 105138184 A | 12/2015 |
| CN | 109062457 A | 12/2018 |
| CN | 111090359 A | 5/2020 |
| CN | 111666001 A | 9/2020 |
| CN | 13391728 A | 9/2021 |

OTHER PUBLICATIONS

First Office Action issued in counterpart Chinese Patent Application No. 202211205860.X, dated Nov. 10, 2022.
Grant Notification issued in counterpart Chinese Patent Application No. 202211205860.X, dated Nov. 28, 2022.

* cited by examiner

*Primary Examiner* — Robin J Mishler
(74) *Attorney, Agent, or Firm* — Westbridge IP LLC (57) ABSTRACT

Disclosed are a touch panel and a touch display device, the touch panel includes a display area and a non-display area. The display area is provided with a plurality of row electrodes arranged at intervals along a first direction and a plurality of column electrodes arranged at intervals along a second direction. The non-display area is provided with a driving unit electrically connected to each row electrode which is provided with a plurality of first open holes, and each column electrode includes a plurality of electrode blocks; each electrode block is arranged in the first open hole, and the electrode block is insulated from the row electrode; each electrode block is provided with a second open hole, and a plurality of self-capacitance electrodes are provided in the display area; each self-capacitance electrode is arranged in the second open hole, and the self-capacitance electrode is insulated from the electrode block.

9 Claims, 6 Drawing Sheets

TOUCH PANEL AND TOUCH DISPLAY DEVICE

CROSS-REFERENCE TO RELATED APPLICATIONS

The present application claims priority to Chinese Patent Application No. 202211205860.X, filed on Sep. 30, 2022, the entire contents of which are incorporated herein by reference.

TECHNICAL FIELD

The present application relates to the technical field of display technology, and in particular to a touch panel and a touch display device.

BACKGROUND

The touch display device includes a display panel for display and a touch panel cooperated with the display panel. The touch panel mainly includes a resistive touch panel and a capacitance touch panel, and the capacitance touch panel is widely used.

The capacitance touch panel includes a self-capacitance touch panel and a mutual capacitance touch panel. A row electrode and a column electrode, which are made of indium tin oxide (ITO), are perpendicularly arranged and overlap with each other to form a mesh shape, so as to form the touch electrode of the mutual capacitance touch panel. A capacitor will be formed where the row electrode is overlapped with the column electrode, and the row electrode and the column electrode respectively form two electrodes of the capacitor. When a touch object such as a finger or a stylus touches the capacitance screen, the touch object will affect the coupling between the two electrodes near the touch point, thereby changing the capacitance between the two electrodes. When detecting the touch point, each row electrode sends an excitation signal in sequence, and each column electrode receives the signal at the same time, so that the capacitance value at the intersection of all row and column electrodes, that is, the capacitance of the entire touch panel on the two-dimensional plane can be obtained, and the location of the touch point can be determined according to the difference of the capacitance.

In related art, only when the mutual capacitance touch panel is touched and pressed by a touch object such as a finger or a stylus, the coupling capacitance between the row electrode and the column electrode will change. The mutual capacitance touch panel cannot make an accurate touch response when the touch object is not in contact, thus the mutual capacitance touch panel cannot be floatingly operated, which limits the application scenarios of the mutual capacitance touch panel.

SUMMARY

The main purpose of the present application is to provide a touch panel, aiming to realize the floating touch operation of the mutual capacitance touch panel and enrich the application scenarios of the mutual capacitance touch panel.

To achieve the above objective, the present application provides a touch panel, including: a display area and a non-display area.

The display area is provided with a plurality of row electrodes arranged at intervals along a first direction and a plurality of column electrodes arranged at intervals along a second direction. The first direction is perpendicular to the second direction, and the non-display area is provided with a driving unit electrically connected to each row electrode;

each row electrode is provided with a plurality of first open holes, and each column electrode includes a plurality of electrode blocks; each electrode block is arranged in the first open hole, and the electrode block is insulated from the row electrode;

each electrode block is provided with a second open hole, and a plurality of self-capacitance electrodes are provided in the display area; each self-capacitance electrode is arranged in the second open hole, and the self-capacitance electrode is insulated from the electrode block;

each self-capacitance electrode and each electrode block are electrically connected to the driving unit;

the second open hole and the first open hole are formed by a same etching process, so that the column electrode and the self-capacitance electrode are formed on the row electrode in the same etching process;

the display area is further provided with a plurality of connecting bridges, and the non-display area is further provided with a plurality of mutual capacitance detecting signal lines and a plurality of mutual capacitance driving signal lines;

each connecting bridge is connected to two adjacent electrode blocks in the column electrode; each mutual capacitance detecting signal line is connected to the driving unit and the row electrode, and each mutual capacitance driving signal line is connected to the driving unit and the electrode block of the column electrode;

the touch panel is provided with a plurality of self-capacitance touch signal lines, and each self-capacitance touch signal line is connected to the driving unit and the self-capacitance electrode;

the touch panel is provided with a floating touch state and a mutual capacitance touch detection state;

in the floating touch state, each self-capacitance electrode is powered on, and each row electrode and each electrode block are powered off; and in the mutual capacitance touch detection state, each self-capacitance electrode is powered off, and each row electrode and each electrode block are powered on.

In an embodiment, a distance between an inner peripheral wall of the first open hole and an outer peripheral wall of the electrode block in the first open hole is equal.

In an embodiment, a distance between an inner peripheral wall of the second open hole and an outer peripheral wall of the self-capacitance electrode in the second open hole is equal.

In an embodiment, the first open hole is a circular hole, and the electrode block is a circular ring structure; and/or the second open hole is a circular hole, and the self-capacitance electrode is a circular structure.

In an embodiment, a minimum distance between the inner peripheral wall of the first open hole and the outer peripheral wall of the electrode block arranged in the first open hole is greater than or equal to 8 μm; and/or a minimum distance between the inner peripheral wall of the second open hole and the outer peripheral wall of the self-capacitance electrode arranged in the second open hole is greater than or equal to 8 μm; and/or an inner width of the first open hole is greater than or equal to 6 mm and less than or equal to 8 mm; and/or an inner width of the second open hole is greater than or equal to 3 mm.

In an embodiment, the self-capacitance electrode is provided with a third open hole for passing a light.

In an embodiment, the plurality of mutual capacitance detecting signal lines are respectively arranged on opposite sides of each row electrode along the second direction; and/or a partial structure of each mutual capacitance driving signal line is arranged between the driving unit and the display area.

The present disclosure also provides a touch display device, including: the touch panel, an organic light-emitting diode (OLED) display panel, and a polarizer.

The touch panel is arranged on a light emitting side of the OLED display panel, and the polarizer is arranged on a side of the touch panel facing away from the OLED display panel.

In an embodiment, the OLED display panel is provided with a pixel layer, and the pixel layer includes a plurality of sub-pixel units arranged in an array; a spacer region is formed between two adjacent sub-pixel units, and an orthographic projection of each self-capacitance touch signal line on the pixel layer is arranged in the spacer region.

In the technical solution of the present application, the row electrodes arranged in a first direction and the column electrodes arranged in a second direction perpendicular to the first direction are arranged at intervals in the display area of the touch panel, the column electrodes include a plurality of electrode blocks, each electrode block is arranged at a first open hole of each row electrode, and each electrode block is provided with a second open hole configured to accommodate the self-capacitance electrode, so that each row electrode, each electrode block, and each capacitance electrode are electrically connected to the driving unit in the non-display area. In this way, the touch panel becomes a mutual capacitance touch panel because it is provided with the column electrode and the row electrode overlapped in the mesh shape, and the touch panel can detect the touch point location on the touch panel when the electrode blocks in the row electrode and the column electrode are powered on at the same time. The self-capacitance electrode can be powered on, the row electrode and the electrode blocks can be depowered on by the driving unit, so that the touch channel which realizes the mutual capacitance detection in the touch panel can be closed. At this time, the coupling capacitance is formed between the self-capacitance electrode and the touch object such as a finger or a stylus, and the coupling capacitance changes with the distance between the touch object and the self-capacitance electrode. The self-capacitance electrode which the touch object is close to can be determined according to the capacitance change of each self-capacitance electrode obtained by the driving unit, so that the position of the touch point which is floatingly touched on the touch panel can be determined, so as to respond to the floating touch control operation. In this way, the touch panel can open a touch channel of the self-capacitance detection when the self-capacitance electrodes are powered on, switch the touch panel with the original mutual capacitance touch structure to the self-capacitance touch detection state, realize the floating touch operation of the touch panel, and enrich the application scenarios of the mutual capacitance touch panel.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those of ordinary skill in the art, other drawings can also be obtained according to the structures shown in these drawings without any creative effort.

The achievement of the purpose of the present application, functional characteristics and advantages will be further described with reference to the accompanying drawings in conjunction with embodiments.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In the description of the present application, it should be noted that unless otherwise specified and limited, the terms "installation", "connecting" and "connection" should be understood in a broad sense, for example, it can be a fixed connection, a detachable connection, integrally connected, mechanically connected, electrically connected, directly connected or indirectly connected through an intermediary, and it can be the internal communication of two components. Those skilled in the art can understand the specific meanings of the above terms in the present application according to specific situations.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the disclosure includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this disclosure.

Figure 1:
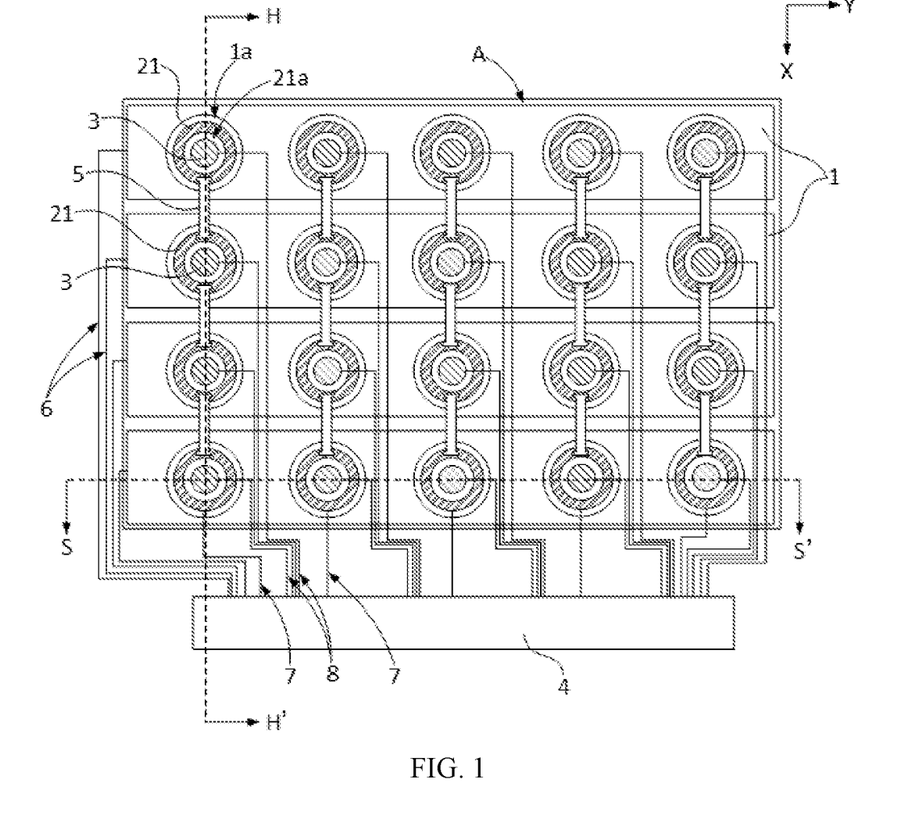
FIG. 1 is a schematic structural view of a touch panel according to an embodiment of the present application.

The present application provides a touch panel 10. Referring to FIG. 1, the touch panel 10 includes a display area A and a non-display area. A plurality of row electrodes 1 are arranged at intervals along a first direction, that is, an X-axis direction in FIG. 1, a plurality of column electrodes are arranged at intervals along a second direction, that is, a Y-axis direction in FIG. 1, the first direction is perpendicular to the second direction, and the non-display area is provided with a driving unit 4 electrically connected to each row electrode 1. Each row electrode 1 is provided with a plurality of first open holes 1a, each column electrode includes a plurality of electrode blocks 21, each electrode block 21 is arranged in the first open hole 1a, and is insulated from the row electrode 1. Each electrode block 21 is provided with a second open hole 21a, a plurality of self-capacitance electrodes 3 are provided in the display area A, each self-capacitance electrode 3 is arranged in the second open hole 21a, and is insulated from the electrode block 21. Each self-capacitance electrode 3 and each electrode block 21 are electrically connected to the driving unit 4, and the touch panel 10 has a floating touch state. When in the floating touch state, each capacitance electrode 3 is powered on, and each row electrode 1 and each electrode block 21 are powered off.

In this embodiment, the display area A is used for touch operation, the non-display area is arranged on a periphery of the display area A, and is used for arranging signal lines and bonding chips. The display area A is provided with a row electrode 1 and a column electrode overlapped with the row electrode 1, each row electrode 1 is in a strip shape, each row electrode 1 is arranged at intervals and parallel to each other, and each row electrode 1 is extended along the second direction. Each row electrode 1 is electrically connected to the driving unit 4 through a mutual capacitance detecting signal line, and forms a first touch detection channel. Each column electrode is extended along the first direction perpendicular to the second direction, and the column electrode includes a plurality of fragment structures, that is, the electrode blocks 21, arranged at intervals. Each electrode block 21 is electrically connected to the driving unit 4 through a mutual capacitance driving signal line, and forms a second touch detection channel. When each row electrode 1 and each electrode block 21 are powered on at the same time, the first touch detection channel and the second touch detection channel are turned on, one of the first touch detection channel and the second touch detection channel transmits a driving signal sent by the driving unit 4, and the driving unit 4 receives a feedback detecting signal through another one of the first touch detection channel and the second touch detection channel, which realizes the mutual capacitance touch detection function of the touch panel 10.

The row electrode 1, the column electrode and the self-capacitance electrode 3 can be fabricated on the substrate of the touch panel 10 by a vapor deposition process, and the first open hole 1a of the row electrode 1 and the second open hole 21a of the column electrode can be made through a same etching process, so that the column electrode and the self-capacitance electrode 3 can be made on the row electrode 1 through the same etching process, which saves the production procedure of the touch panel 10, and reduces the production cost of the touch panel 10. An outer peripheral wall of the electrode block 21 is spaced from an inner peripheral wall of the first open hole 1a, and an outer peripheral wall of the self-capacitance electrode 3 is spaced from an inner peripheral wall of the second open hole 21a, so that the electrode block 21 is insulated from the row electrode 1, and the self-capacitance electrode 3 is insulated from the electrode block 21 and the row electrode 1. Each self-capacitance electrode 3 is connected to the driving unit 4 through a self-capacitance touch signal line 8, and the driving unit 4 drives the self-capacitance electrode 3 to work and receives a feedback electrical signal from the self-capacitance electrode 3 to determine whether the self-capacitance electrode 3 is contactingly touched or floatingly touched. Since the self-capacitance touch detection uses a ground as a reference potential, when the touch object such as the finger or the stylus is close to the self-capacitance electrode 3, another coupling capacitance is formed between the self-capacitance electrode 3 and the touch object. The size of the capacitance will change with a distance between the touch object and the self-capacitance electrode 3, then a potential of the self-capacitance electrode 3 will change, and the driving unit 4 can detect whether the potential of the self-capacitance electrode 3 changes and determine whether a touch area where the electrode 3 is arranged is floatingly touched accordingly, so as to realize the self-capacitance touch detection function of the touch panel 10. Based on the self-capacitance touch detection principle, the touch panel 10 can generally detect the floating touch operation when the distance between the touch object and the touch panel 10 is within 2 cm.

Each self-capacitance electrode 3 is electrically connected with the driving unit 4 to form a third touch detection channel, and the third touch detection channel is turned on when the self-capacitance electrode 3 is powered on. By controlling the first touch detection channel and the second touch detection channel to be turned off when the third touch detection channel is turned on, or be turned on when the third touch detection channel is turned off. When the first touch detection channel and the second touch detection channel are turned on and the third touch detection channel is turned off, the touch panel can switch to the mutual capacitance touch detection state, and when the first touch detection channel and the second touch detection channel are turned off and the third touch detection channel is turned on, the touch panel 10 can switch to the self-capacitance touch detection state to acquire the function of floating touch detection. In this way, the touch panel 10 can be switched between different states according to actual touch operation needs, so that the touch panel 10 adopting the mutual capacitance touch detection structure also has the function of self-capacitance touch detection, which realizes the floating touch detection of the touch panel 10 adopting the mutual capacitance touch detection structure. In a scenario where it is inconvenient for the user to touch the screen with fingers, such as when the user wears gloves in winter or the fingers are dirty, the user can still operate the touch panel 10 in a floating touch manner.

The touch panel 10 provided in this embodiment becomes a mutual capacitance touch panel 10 because it is provided with column electrodes and row electrode 1 overlapped in a mesh shape, the touch panel 10 can simultaneously detect the touch point when the electrode blocks 21 in the row electrode 1 and the column electrode are powered on, and the self-capacitance electrode 3 is not powered on at this time. Then the self-capacitance electrodes 3 is powered on and each row electrode 1 and each electrode block 21 are powered off by the driving unit 4, so that the touch channel for realizing the mutual capacitance detection in the touch panel 10 can be closed. At this time, the touch panel 10, based on the principle of self-capacitance touch detection, a coupling capacitance is formed between the self-capacitance electrode 3 and the touch object such as the finger or the stylus, and the size of the coupling capacitance changes with the distance between the touch object and the self-capacitance electrode 3, the self-capacitance electrode 3 close to the touch object can be determined according to the capacitance changes at each self-capacitance electrode 3 obtained by the driving unit 4, so as to determine the location of the point where the touch panel 10 is floatingly touched, and response to the floating touch operation. In this way, the touch panel 10 can turn on the self-capacitance detection touch channel when the self-capacitance electrodes 3 are powered on, and switch the touch panel 10 with the original mutual capacitance touch structure to the self-capacitance touch detection state, which realizes the floating touch operation of the touch panel 10, and enriches the application scenarios of the mutual capacitance touch panel 10.

Figure 2:
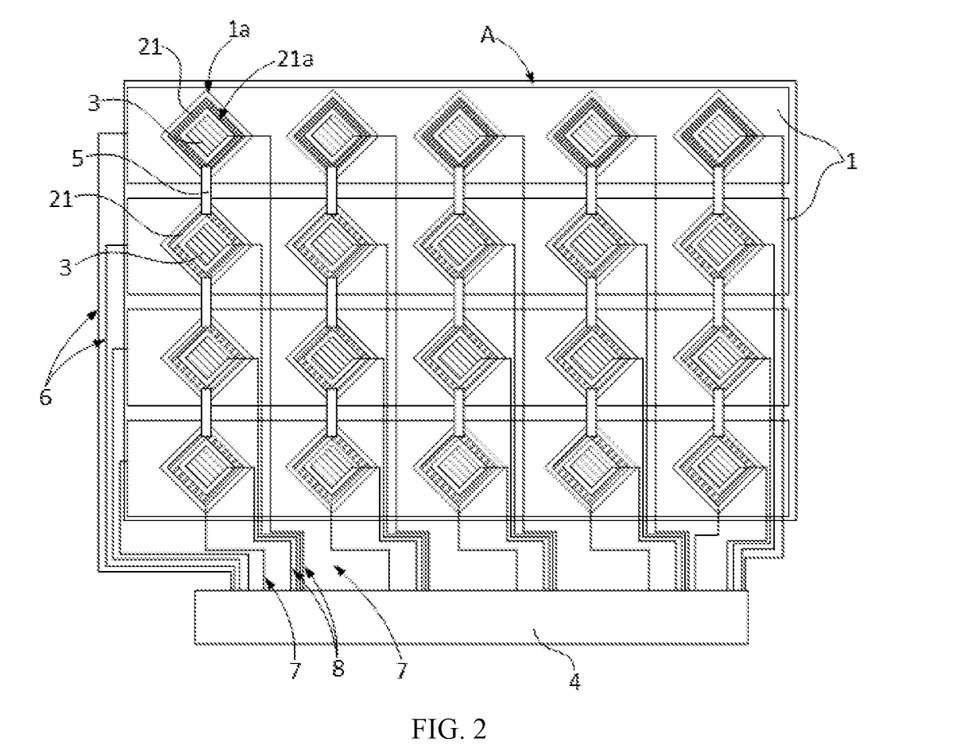
FIG. 2 is a schematic structural view of a touch panel according to an embodiment of the present application.

In an embodiment of the present application, referring to FIG. 1 and FIG. 2, the distance between the inner peripheral wall of the first open hole 1a and the outer peripheral wall of the electrode block 21 inside the first open hole 1a is equal everywhere.

In this embodiment, a shape of the first open hole 1a can be rectangular, rhombus, circular, oval, etc., the shape of the outer peripheral wall of the electrode block 21 is matched with the shape of the inner peripheral wall of the first open hole 1a, and the distance between the outer peripheral wall of the electrode block 21 and the inner peripheral wall of the first open hole 1a is equal everywhere, that is, a space between the outer peripheral wall of the electrode block 21 and the inner peripheral wall of the first open hole 1a is a uniform space with an equal width. In this way, a parasitic capacitance between the outer peripheral wall of the electrode block 21 and the inner peripheral wall of the first open hole 1a is identical in all directions, and the parasitic capacitance between the electrode block 21 and the row electrode 1 is constant and easy to calculate. The parasitic capacitance will affect the potential of the electrode block 21 when touched, then affect the electrical signal from the electrode block 21 to the driving unit 4 and the location of the touch point calculated by the driving unit 4. Therefore, in this embodiment, the first open hole 1a is matched with the electrode block 21, which improves a touch detection accuracy of the touch panel 10, and an occasion will not happen where one end of the electrode block 21 is close to the inner wall of the first open hole 1a and another end of the electrode block 21 is far away from the first open hole 1a, the electrode block 21 feeds back completely different electrical signals to the driving unit 4 when an area where two ends of the electrode block 21 are arranged is touched, and results in an inaccurate touch detection of the touch panel 10, or increases a complexity to a calculation algorithm of the touch point.

In an embodiment of the present application, referring to FIG. 1 and FIG. 2, the distance between the inner peripheral wall of the second open hole 21a and the outer peripheral wall of the self-capacitance electrode 3 inside the second open hole 21a is equal everywhere.

In this embodiment, a shape of the second open hole 21a can be rectangular, rhombus, circular, oval, etc., the shape of the outer peripheral wall of the self-capacitance electrode 3 is matched with the shape of the inner peripheral wall of the second open hole 21a, and the distance between the outer peripheral wall of the self-capacitance electrode 3 and the inner peripheral wall of the second open hole 21a is equal everywhere, that is, a space between the outer peripheral wall of the self-capacitance electrode 3 and the inner peripheral wall of the second open hole 21a is a uniform space with an equal width. In this way, a parasitic capacitance between the outer peripheral wall of the self-capacitance electrode 3 and the inner peripheral wall of the second open hole 21a is identical in all directions, and the parasitic capacitance between the self-capacitance electrode 3 and the row electrode 1 is constant and easy to calculate. The parasitic capacitance will affect the potential of the self-capacitance electrode 3 when touched, then affect the electrical signal from the self-capacitance electrode 3 to the driving unit 4 and the location of the touch point calculated by the driving unit 4. Therefore, in this embodiment, the second open hole 21a is matched with the self-capacitance electrode 3, which improves a touch detection accuracy of the touch panel 10, and an occasion will not happen where one end of the self-capacitance electrode 3 is close to the inner wall of the second open hole 21a and another end of the self-capacitance electrode 3 is far away from the second open hole 21a, the self-capacitance electrode 3 feeds back completely different electrical signals to the driving unit 4 when an area where two ends of the self-capacitance electrode 3 are arranged is touched, and results in an inaccurate touch detection of the touch panel 10, or increases a complexity to a calculation algorithm of the touch point.

In one embodiment of the present application, referring to FIG. 1, the first open hole 1a is a circular hole, and the electrode block 21 is a circular ring structure; and/or, the second open hole 21a is a circular hole, and the self-capacitance electrode 3 is a circular structure.

In this embodiment, the first open hole 1a is a circular hole, when the electrode block 21 is a circular ring structure, the shape of the inner peripheral wall of the first open hole 1a is matched with the shape of the inner peripheral wall of the electrode block 21, the shape of the first open hole and the electrode block 21 are easy to design and manufacture, and the circular first open hole 1a and the circular ring-shaped electrode block 21 are also easier to fit into a pressing area formed when the finger touches the touch panel 10, which improves the touch detection accuracy of the touch panel 10. In addition, compared with a rhombus or a square electrode structure, the circular first open hole 1a and the circular ring-shaped electrode block 21 can also make it possible to arrange more electrode blocks 21 and self-capacitance electrodes 3 in the row electrode 1, which reduces a touch blind area of the touch panel 10.

Similarly, when the second open hole 21a is a circular hole and the self-capacitance electrode 3 is a circular structure, the circular second open hole 21a and the circular self-capacitance electrode 3 are easier to fit into the pressing area formed when the finger touches the touch panel 10, which improves the touch detection accuracy of the touch panel 10, makes it possible to arrange more electrode blocks 21 and self-capacitance electrodes 3 in the row electrode 1, and reduces the touch blind area of the touch panel 10.

In one embodiment of the present application, referring to FIG. 1, a minimum distance between the inner peripheral wall of the first open hole 1a and the outer peripheral wall of the electrode block 21 arranged in the first open hole 1a is greater than or equal to 8 µm, and/or, a minimum distance between the inner peripheral wall of the second open hole 21a and the outer peripheral wall of the self-capacitance electrode 3 arranged in the second open hole 21a is greater than or equal to 8 µm, and/or, an inner width of the first open hole 1a is greater than or equal to 6 mm and less than or equal to 8 mm, and/or, an inner width of the second open hole 21a is greater than or equal to 3 mm.

In this embodiment, the minimum distance between the inner peripheral wall of the first open hole 1a and the outer peripheral wall of the electrode block arranged in the first open hole 1a is greater than or equal to 8 μm, which can avoid an occasion where the distance between the electrode block 21 and the inner peripheral wall of the first open hole 1a is too small, a space between the electrode block 21 and the row electrode 1 is electrically broken down to conduct and the parasitic capacitance between the electrode block 21 and the row electrode 1 is too large. Similarly, setting the minimum distance between the inner peripheral wall of the second open hole 21a and the outer peripheral wall of the self-capacitance electrode 3 arranged in the second open hole 21a to be greater than or equal to 8 μm can solve the problem.

Setting the inner width of the first open hole 1a to be greater than or equal to 6 mm and less than or equal to 8 mm can avoid an occasion where the inner width of the first open hole 1a is too small, an area of the electrode block 21 and the self-capacitance electrode 3 in the first open hole 1a is too small, a large number of the first open holes 1a, the electrode blocks 21 and the self-capacitance electrodes 3 need to be provided when the electrode needs to cover the display area A of the touch panel 10. Setting the inner width of the first open hole 1a to be greater than or equal to 6 mm and less than or equal to 8 mm can also avoid an occasion where the inner width of the row electrode 1 is too large, the width of each row electrode 1 needs to be greatly increased, which increases the area of the row electrode, the material cost and the manufacturing cost of the row electrode 1. The inner width of the first open hole 1a is a maximum width of the first open hole 1a, for example, when the first open hole 1a is a circular hole, the inner width of the first open hole 1a is a diameter of the first open hole 1a; when the first open hole 1a is a diamond-shaped hole, the inner width of the first open hole is a length of a longer diagonal.

Setting the inner width of the second open hole 21a to be greater than or equal to 3 mm can avoid the problems that: the area of the self-capacitance electrode 3 in the second open hole 21a is too small when the inner width of the second open hole 21a is too small; the touch detection of the touch panel 10 is not sensitive when the touch detection is performed through the self-capacitance electrode 3; and a large number of settings are required when the self-capacitance electrode 3 needs to cover the display area A of the touch panel 10.

Figure 3:
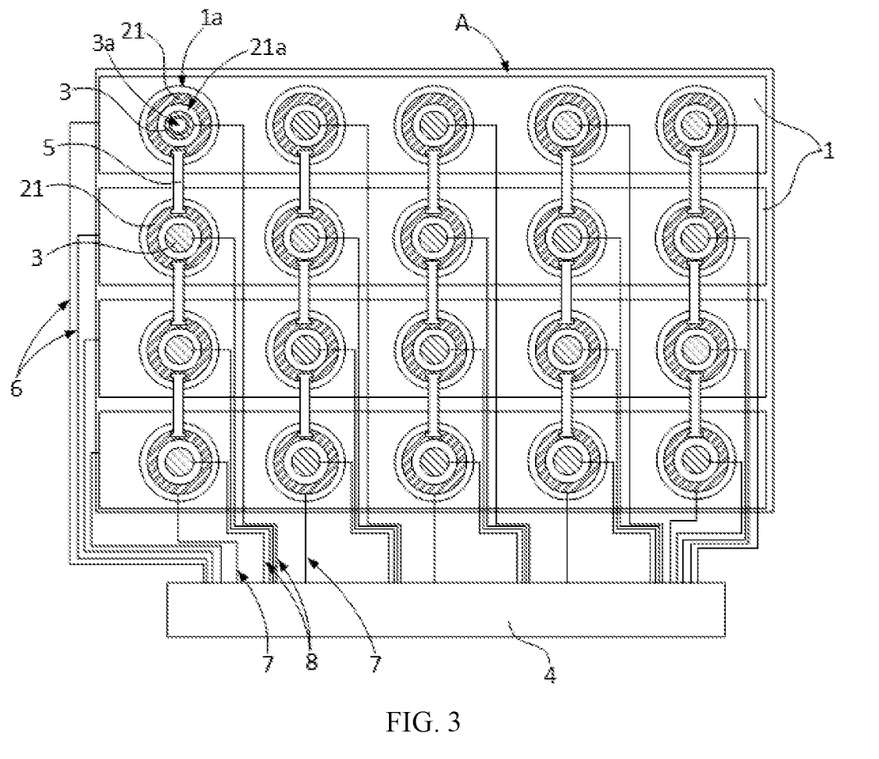
FIG. 3 is a schematic structural view of a touch panel according to an embodiment of the present application.

In an embodiment of the present application, referring to FIG. 3, a third open hole is provided on the self-capacitance electrode 3 for passing a light.

In this embodiment, a third open hole 3a through which the light can pass is opened in the self-capacitance electrode 3, so that when the touch panel 10 applied to the display panel, the third open hole 3a can be arranged corresponding to an under-screen camera and other optical devices in the display panel for lighting the optical devices, which further enriches the functions and application scenarios of the touch panel 10. At this time, the self-capacitance electrode 3 is in a ring shape, and can detect the touch operation and send a corresponding electrical signal to the driving unit 4 when the touch area corresponding to the self-capacitance electrode 3 is floatingly touched, which realizes an overall-area touch detection of the display area A of the touch panel under a condition that the third open hole 3a is opened. Therefore, when the third open hole 3a is opened in the self-capacitance electrode 3, not only can the third open hole 3a provide a good lighting condition for the optical device under the screen when the touch panel 10 is applied to the display panel, but the third open hole 3a can also produce no influence to the touch detection function of the touch panel 10 at the self-capacitance electrode 3. In addition, no other areas of the display area A of the touch panel 10 are occupied, which makes a full use of the space in the display area A of the touch panel 10 to increase a light transmittance of the touch panel 10, and ensures a display effect of the touch panel 10 under a condition of a high light transmittance.

In one embodiment of the present application, referring to FIG. 1, a plurality of connecting bridges 5 are also provided in the display area A, and a plurality of mutual capacitance detecting signal lines and a plurality of mutual capacitance driving signal lines are also arranged in the non-display area. Each connecting bridge 5 is connected to two adjacent electrode blocks 21 in the column electrode, each mutual capacitance detecting signal line is connected to the driving unit 4 and the row electrode 1, and each mutual capacitance driving signal line is connected to the driving unit 4 and the electrode block 21 of the column electrode.

In this embodiment, the mutual capacitance detecting signal line is used to feed back the detecting signal, the mutual capacitance driving signal line is used to input the driving signal, that is, the scanning signal. The driving unit 4 inputs the driving signal to each electrode block 21 through the mutual capacitance detecting signal line and the connecting bridge 5, receives the detecting signal fed back from each row electrode 1 through the mutual capacitance detecting signal line, determines the touched electrode block 21 and a corresponding position of the touch point according to the difference between the input signal and the feedback signal, and realizes the mutual capacitance touch detection function of the touch panel 10. The connecting bridge 5, made of a conductive metal or a metal oxide, can be an elongated structure. Two ends of the connecting bridge 5 are respectively connected to two adjacent electrode blocks 21, and each electrode in the column electrode block 21 is sequentially connected in series through the plurality of connecting bridges 5.

In an embodiment of the present application, referring to FIG. 1, the plurality of mutual capacitance detecting signal lines are respectively arranged on opposite sides of each row electrode 1 along the second direction, and/or, a part of a structure of each mutual capacitance driving signal line is arranged between the driving unit 4 and the display area A.

In this embodiment, the mutual capacitance detecting signal lines are arranged on two sides of the row electrode 1, so as to avoid an occasion where all the mutual capacitance detecting signal lines are arranged on one side of the row electrode 1, and a side frame area of the touch panel 10 is relatively wide, which helps to realize a narrow frame design of the touch panel 10.

Arranging the mutual capacitance driving signal lines in the space between the driving unit 4 and the display area A can reduce a routing length of the mutual capacitance driving signal lines, save the material cost of the mutual capacitance driving signal lines, and reduce a width of a lower frame of the touch panel 10, which helps to realize a narrow frame design of the touch panel 10.

Figure 4:
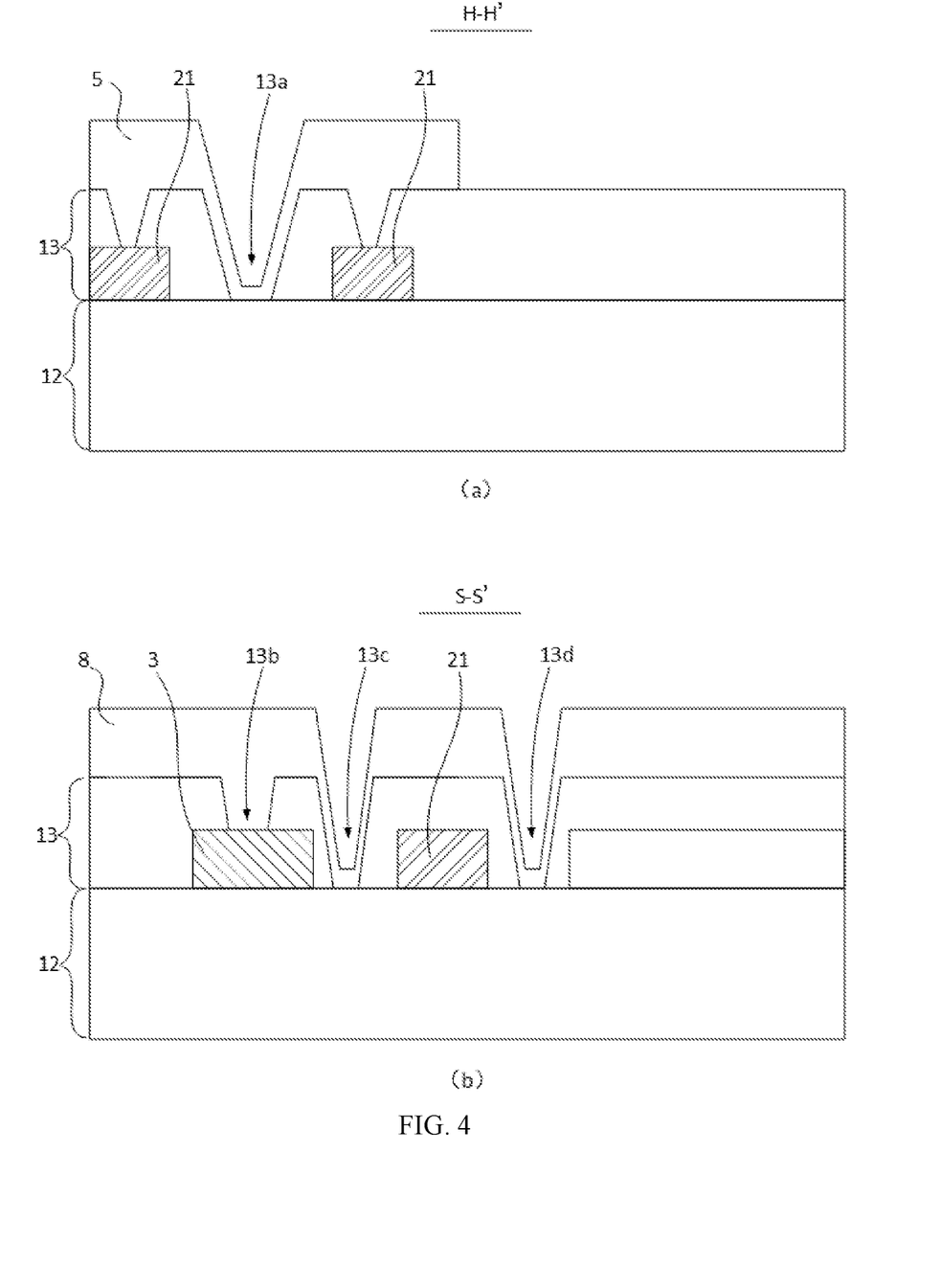
FIG. 4 is a schematic cross-sectional structure view of the touch panel in FIG. 1 along line H-H' and line S-S'.

In one embodiment of the present application, referring to FIG. 1 and FIG. 4, the touch panel 10 includes a substrate 12, an electrode layer arranged on the substrate 12, an insulating layer 13 arranged on a side of the electrode layer facing away from the substrate 12, and a conductive metal layer arranged on a side of the insulating layer 13 facing away from the substrate 12. The electrode layer includes the row electrode 1, the column electrode made of the plurality of electrode blocks 21, and the self-capacitance electrode 3. The row electrode 1 is produced in a same layer by the same magnetron sputtering process, that is, a physical vapor deposition process. The conductive metal layer includes the connecting bridge 5 and the self-capacitance touch signal line 8, and the connecting bridge 5 is produced in a same layer by a chemical vapor deposition process.

Specifically, referring to FIG. 4, after the electrode layer is produced on the substrate 12 by the physical vapor deposition process, the electrode layer is patterned by a same etching process to form each row electrode 1, each electrode block 21 and the self-capacitance electrode 3. The insulating layer 13 is formed on the substrate 12 and on one side of each row electrode 1 and each electrode block 21 facing away from the substrate through the chemical vapor deposition process. A first via hole 13a, a second via hole 13b, a third via hole 13c and a fourth via hole 13d are formed on the insulating layer 13 through a same photomask process. The first via hole 13a is a gap area between two adjacent row electrodes 1, and is shaped as a strip channel. The second via hole 13b is arranged directly above the self-capacitance electrode 3 and is extended toward the self-capacitance electrode 3, the second via hole 13b is used to realize a connection between the self-capacitance touch signal line 8 and the self-capacitance electrode 3, and the second via hole 13b is a circular or a polygonal open hole. The third via hole 13c is a gap area between the self-capacitance electrode 3 and the electrode block 21, and is shaped as an annular channel. The fourth via hole 13d is a gap area between the electrode block 21 and the row electrode 1, and is shaped in an annular channel. The connecting bridge 5 and the self-capacitance touch signal line 8 are fabricated on one side of the insulating layer 13 facing away from the substrate 12 through a same chemical vapor deposition process, so that the connecting bridge 5 is arranged along an inner wall of the first via hole 13a, and the self-capacitance touch signal line 8 is arranged along an inner wall of the second via hole 13b, the third via hole 13c and the fourth via hole 13d.

In this embodiment, the self-capacitance touch detection function can be added to the mutual-capacitance touch panel through the same process and same-layer production method, which enriches the touch detection function of the touch panel 10 and saves the cost of touch control at the same time, improves the production efficiency of the touch panel 10, and reduces the production cost of the touch panel 10.

In this embodiment, because made of an insulating material, the insulating layer 13 at the first via hole 13a, without the first via hole 13a, the third via hole 13c, and the fourth via hole 13d, can insulate and isolate the two adjacent row electrodes 1. The insulating layer 13 at the third via hole 13c can insulate and isolate the self-capacitance electrode 3 and the electrode block 21, and the insulating layer 13 at the third via hole can also insulate the electrode block 21 and the row electrode 1.

In this embodiment, by setting the first via hole 13a, third via hole 13c and fourth via hole 13d on the insulating layer, a structural thickness of the insulating layer 13 at the first via hole 13a, the third via hole 13c and the fourth via hole 13d can be reduced or even eliminated, a light-shielding volume of the insulating layer 13 is reduced, and the light transmittance of the touch panel 10 is improved. Since the first via hole 13a is the elongated channel, the third via hole 13c and the fourth via hole 13d are annular channels, the connecting bridge 5 is perpendicularly overlapped with the elongated first via hole 13a, and can only cover a small part of the first via hole 13a. When overlapped with the ring-shaped third via hole 13c and the fourth via hole 13d, the self-capacitance touch signal line 8 can only cover a very small part of the third via hole 13c and the fourth via hole 13d. Therefore, under a condition where the connecting bridge 5 and the self-capacitance touch signal line 8 are opaque, the touch panel 10 can still greatly improve the light transmittance through the first via hole, the third via hole 13c and the fourth via hole 13d.

The insulating layer 13 is made of the insulating material, so that the insulating layer 13 may be without the first via hole 13a, third via hole 13c, and fourth via hole 13d. At this time, the touch panel 10 can be processed according to the following process: depositing the electrode layer on the substrate 12; etching the electrode layer through an etching process to produce the row electrode 1, the column electrode composed of the plurality of electrode blocks 21, and the self-capacitance electrode 3, that is, producing a touch electrode part with the mutual capacitance and the self-capacitance touch detection function through one process, and the product function of the touch panel is increased without adding the production process; producing the insulating layer 13 on the electrode layer through the chemical vapor deposition process; etching the insulating layer 13 through the same photomask process to form the first via hole 13a and the fifth via hole, as shown in part a in FIG. 5; producing the connecting bridge 5 and the self-capacitance touch signal line 8 on the insulating layer 13 through the same magnetron sputtering process, arranging the connecting bridge 5 along the inner wall of the fifth via hole and connected to the electrode block 21, so that the adjacent electrode blocks 21 are connected through the connecting bridge 5; arranging the self-capacitance touch signal line 8 along the inner wall of the first via hole 13a and connected to the self-capacitance electrode 3, thus the processing of the touch panel is completed. Through the above manufacturing steps, while the touch panel 10 has mutual capacitance and self-capacitance touch detection functions at the same time, the manufacturing process of the touch panel 10 is basically the same as that of a touch panel with only mutual capacitance or self-capacitance touch detection function. It takes fewer processes to produce the touch panel 10, the production cost does not increase under a premise that the touch function and performance of the product is improved, thus the touch panel 10 has good economic benefits.

Figure 6:
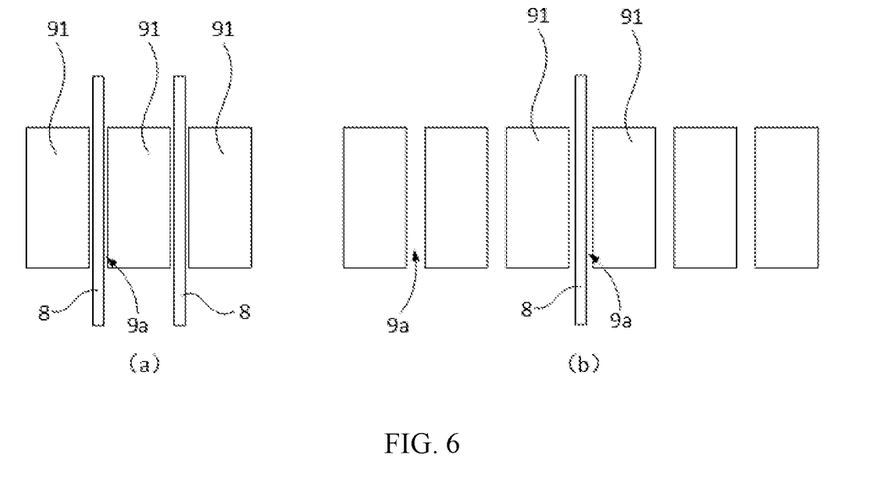
FIG. 6 is a schematic view of a positional relationship between a self-capacitance touch signal line and a sub-pixel unit of the touch display device in FIG. 5.

The embodiment of the present application also provides a touch display device. Referring to FIG. 1 and FIG. 6, the touch display device includes an organic light-emitting diode (OLED) display panel 9, a polarizer 11 and the touch panel 10. The touch panel 10 is arranged on a light emitting side of the OLED display panel 9, and the polarizer 11 is arranged on a side of the touch panel 10 facing away from the OLED display panel 9.

In this embodiment, the touch panel 10 is used in combination with the OLED display panel 9, and the touch panel 10 is arranged between the OLED display panel 9 and the polarizer 11, and the touch display device is an on-cell architecture. Since the LCD display panel cannot emit light like the OLED display panel 9, and the LCD display panel also needs a supporting backlight module to form the display device, when the LCD display panel adopts the on-cell structure, a thickness of the touch display device will be thicker, a volume of the touch display device will also be relatively large, which does not help to realize the thinner and lighter design of the touch display device. A specific structure of the touch panel 10 refers to the embodiments. Since the touch display device adopts all the technical solutions of all embodiments, it at least has all the beneficial effects brought by the technical solutions of the embodiments, which will not be repeated herein.

When the touch panel 10 is applied to the OLED display panel 9, the substrate of the touch panel 10 may be a sealing layer of the OLED display panel 9. When the OLED display panel 9 is a rigid panel, the substrate of the touch panel 10 is a sealing cover of the OLED display panel 9. When the OLED display panel 9 is a flexible panel, the substrate of the touch panel 10 is a flexible sealing layer of the OLED display panel 9.

Figure 5:
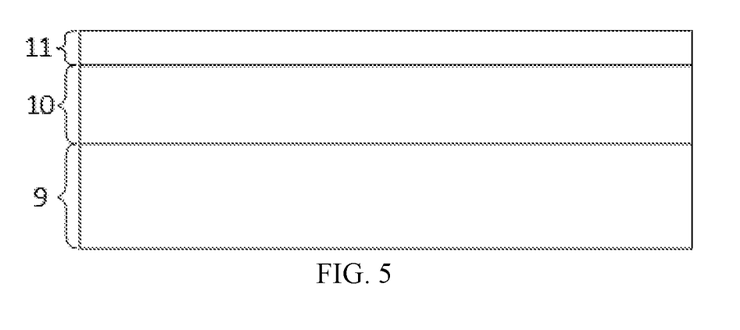
FIG. 5 is a schematic structural view of a touch display device according to an embodiment of the present application.

In an embodiment of the present application, referring to FIG. 1, FIG. 5 and FIG. 6, the touch panel is provided with a plurality of self-capacitance touch signal lines 8, and each self-capacitance touch signal line 8 is connected to the driving unit 4 and the self-capacitance electrode 3. A pixel layer is provided in the OLED display panel 9, the pixel layer includes a plurality of sub-pixel units 91 arranged in an array, a spacer region 9a is formed between two adjacent sub-pixel units 91, and an orthographic projection of each self-capacitance touch signal line 8 on the pixel layer is arranged in the spacer region 9a.

In this embodiment, the OLED display panel 9 includes an anode layer, a hole transporting layer, a light-emitting layer, an electron transporting layer, and a cathode layer. When the anode layer and the cathode layer are powered on, an electric field is formed between the anode layer and the cathode layer, and electrons and holes are injected from the anode layer and the cathode layer to the light-emitting layer between them, the injected electrons migrate from the electron transporting layer to the light-emitting layer and the holes migrate from the hole transporting layer to the light-emitting layer. After the electrons and holes are injected into the light-emitting layer, an electron-hole pair, that is, an exciton, is formed due to a coulomb force. Due to an imbalance of electron and the hole transportation, a main formation region of the exciton usually does not cover the entire light-emitting layer, so a diffusion and a migration will occur due to a concentration gradient, and a photon will be emitted during a radiative transition of the exciton, and a light energy will be released.

In the OLED display panel 9, a sub-pixel unit 91 is arranged corresponding to a light-emitting area of the light-emitting layer, and a plurality of sub-pixel units 91 are arranged on a same layer to form the pixel layer. The sub-pixel unit 91 can be one of a red pixel unit, a green pixel unit, or a blue pixel unit, and used to express a corresponding color. Since a color display area of each sub-pixel unit 91 is an open hole area of the sub-pixel unit 91, the space region 9a between the sub-pixel units 91 is a non-open hole area of the sub-pixel unit 91. In this embodiment, the self-capacitance touch signal line 8 is arranged at a position corresponding to the spacer region 9a between the sub-pixel units 91, which can prevent the self-capacitance touch signal line 8 from blocking the light to the touch panel 10 through the sub-pixel unit 91, and improve a display effect of the touch display device. Three sub-pixel units 91 of different colors form a pixel unit, referring to part a of FIG. 6, the self-capacitance touch signal line 8 can be arranged corresponding to the spacer region 9a between two sub-pixel units 91 in the pixel unit. Referring to part b in FIG. 6, the self-capacitance touch signal line 8 can also be arranged corresponding to the spacer region 9a between two adjacent pixel units, and an arrangement density of the self-capacitance touch signal line 8 can be designed according to actual needs.

The self-capacitance touch signal line 8 in this embodiment can be produced on the same metal layer of the touch panel as the connecting bridge 5, so as to reduce a film thickness of the metal layer and the touch panel 10. Since the connecting bridge 5 is arranged between two adjacent electrode blocks 12, and the electrode block 12 is arranged corresponding to the sub-pixel unit 91 in the OLED display panel 9, so the connecting bridge 5 is arranged corresponding to the spacer region 9a between an upper and a lower adjacent sub-pixel unit 91, that is, the orthographic projection of the connecting bridge 5 on the pixel layer is arranged in the spacer region 9a on an upper or a lower side of the sub-pixel unit 91. The orthographic projection of the self-capacitance touch signal line 8 on the pixel layer is arranged in the spacer region 9a on a left or a right side of the sub-pixel unit 91. In this way, the self-capacitance touch signal line 8 and the connecting bridge 5 can all be away from the open hole area of the sub-pixel unit 91, and will not block the light emitted by the sub-pixel unit 91, which improves the light transmittance of the touch panel 10 and ensures the display effect of the touch display device.

In addition, in an embodiment, the self-capacitance touch signal line 8 and the connecting bridge 5 are alternately arranged at intervals, and the self-capacitance touch signal line 8 and the connecting bridge 5 are orthographically projected on the pixel layer to form two parallel striped shadows. The two striped shadows are arranged on two sides of the sub-pixel unit 91. A relationship among the self-capacitance touch signal line 8, the connecting bridge 5 and the sub-pixel unit 91 can be referred to part a of FIG. 6. One of the two self-capacitance touch signal lines 8 is correspondingly replaced by the connecting bridge 5, that is, the sub-pixel unit 91 is arranged between the two striped shadows of the adjacent self-capacitance touch signal line 8 and the connecting bridge 5 orthographically projected on the pixel layer. In this way, the self-capacitance touch signal line 8 and the connecting bridge 5 can all be arranged away from the open hole area of the sub-pixel unit 91, and will not block the light emitted by the sub-pixel unit 91, which improves the light transmittance of the touch panel 10 and ensures the display effect of the touch display device. The self-capacitance touch signal line 8 and the connecting bridge 5 are arranged away from the open hole area of the sub-pixel unit 91, and the self-capacitance touch signal line 8 and the connecting bridge 5 are arranged in the display area A of the touch panel, which makes full use of an internal space of the display area A, and will not occupy a peripheral space of the display area A, so as to realize the narrow frame design of the touch panel 10 and the touch display device.

The above descriptions are only embodiments of the present application, and are not intended to limit the scope of the present application. Under the inventive concept of the present application, any equivalent structural transformations made by using the contents of the description and drawings of the present application, or direct/indirect disclosures in other related technical fields are included in the scope of the present application.

What is claimed is:
1. A touch panel, comprising:
a display area; and
a non-display area,
wherein the display area is provided with a plurality of row electrodes arranged at intervals along a first direction and a plurality of column electrodes arranged at intervals along a second direction, the first direction is perpendicular to the second direction, and the non-display area is provided with a driving unit electrically connected to each row electrode;

each row electrode is provided with a plurality of first open holes, and each column electrode comprises a plurality of electrode blocks; each electrode block is arranged in the first open hole, and the electrode block is insulated from the row electrode;

each electrode block is provided with a second open hole, and a plurality of self-capacitance electrodes are provided in the display area; each self-capacitance electrode is arranged in the second open hole, and the self-capacitance electrode is insulated from the electrode block;

each self-capacitance electrode and each electrode block are electrically connected to the driving unit;

the second open hole and the first open hole are formed by a same etching process, so that the column electrode and the self-capacitance electrode are formed on the row electrode in the same etching process;

the display area is further provided with a plurality of connecting bridges, and the non-display area is further provided with a plurality of mutual capacitance detecting signal lines and a plurality of mutual capacitance driving signal lines;

each connecting bridge is connected to two adjacent electrode blocks in the column electrode; each mutual capacitance detecting signal line is connected to the driving unit and the row electrode, and each mutual capacitance driving signal line is connected to the driving unit and the electrode block of the column electrode;

the touch panel is provided with a plurality of self-capacitance touch signal lines, and each self-capacitance touch signal line is connected to the driving unit and the self-capacitance electrode;

wherein the touch panel is provided with a floating touch state and a mutual capacitance touch detection state;

in the floating touch state, each self-capacitance electrode is powered on, and each row electrode and each electrode block are powered off; and in the mutual capacitance touch detection state, each self-capacitance electrode is powered off, and each row electrode and each electrode block are powered on.

2. The touch panel of claim 1, wherein a distance between an inner peripheral wall of the first open hole and an outer peripheral wall of the electrode block in the first open hole is equal.

3. The touch panel of claim 1, wherein a distance between an inner peripheral wall of the second open hole and an outer peripheral wall of the self-capacitance electrode in the second open hole is equal.

4. The touch panel of claim 1, wherein:
the first open hole is a circular hole, and the electrode block is a circular ring structure; and/or
the second open hole is a circular hole, and the self-capacitance electrode is a circular structure.

5. The touch panel of claim 1, wherein:
a minimum distance between the inner peripheral wall of the first open hole and the outer peripheral wall of the electrode block arranged in the first open hole is greater than or equal to 8 μm; and/or
a minimum distance between the inner peripheral wall of the second open hole and the outer peripheral wall of the self-capacitance electrode arranged in the second open hole is greater than or equal to 8 μm; and/or
an inner width of the first open hole is greater than or equal to 6 mm and less than or equal to 8 mm; and/or
an inner width of the second open hole is greater than or equal to 3 mm.

6. The touch panel of claim 1, wherein the self-capacitance electrode is provided with a third open hole for passing a light.

7. The touch panel of claim 1, wherein:
the plurality of mutual capacitance detecting signal lines are respectively arranged on opposite sides of each row electrode along the second direction; and/or
a partial structure of each mutual capacitance driving signal line is arranged between the driving unit and the display area.

8. A touch display device, comprising:
the touch panel of claim 1;
an organic light-emitting diode (OLED) display panel, wherein the touch panel is arranged on a light emitting side of the OLED display panel; and
a polarizer, wherein the polarizer is arranged on a side of the touch panel facing away from the OLED display panel.

9. The touch display device of claim 8, wherein the OLED display panel is provided with a pixel layer, and the pixel layer comprises a plurality of sub-pixel units arranged in an array; a spacer region is formed between two adjacent sub-pixel units, and an orthographic projection of each self-capacitance touch signal line on the pixel layer is arranged in the spacer region.

* * * * *